(12) United States Patent
Ougier et al.

(10) Patent No.: US 8,282,378 B2
(45) Date of Patent: Oct. 9, 2012

(54) DEVICE FOR EXTRUDING A STRIP OF RUBBER

(75) Inventors: Christophe Ougier, Le Crest (FR); Christian Monge, Cournon-d'Auvergne (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 952 days.

(21) Appl. No.: 12/261,675

(22) Filed: Oct. 30, 2008

(65) Prior Publication Data

US 2009/0274786 A1 Nov. 5, 2009

(30) Foreign Application Priority Data

Oct. 30, 2007 (FR) ..................... 07 58692

(51) Int. Cl.
- B29C 47/14 (2006.01)
- B29C 47/92 (2006.01)
- B29C 47/32 (2006.01)

(52) U.S. Cl. ..................... 425/224; 425/381; 425/382.3; 425/447; 425/465; 425/466

(58) Field of Classification Search .................. 425/146, 425/224, 380, 381, 382.3, 447, 461, 465, 425/466

See application file for complete search history.

(56) References Cited

U.S. PATENT DOCUMENTS

| | | | |
|---|---|---|---|
| 3,078,513 A * | 2/1963 | Levison et al. | 425/146 |
| 3,359,597 A | 12/1967 | Bainton | |
| 3,543,333 A | 12/1970 | Anders et al. | |
| 3,694,120 A | 9/1972 | Walton | |
| 4,299,789 A * | 11/1981 | Giesbrecht | 264/211.12 |
| 4,642,039 A | 2/1987 | Anders | |
| 5,565,219 A * | 10/1996 | Hatanaka et al. | 425/145 |
| 5,928,679 A * | 7/1999 | Ohki et al. | 425/327 |
| 5,992,764 A * | 11/1999 | Bougamont et al. | 239/459 |
| 6,821,106 B1 * | 11/2004 | Looman et al. | 425/224 |
| 2005/0087905 A1 * | 4/2005 | Looman et al. | 264/177.1 |
| 2005/0183810 A1 * | 8/2005 | Abe et al. | 156/117 |

FOREIGN PATENT DOCUMENTS

| | | |
|---|---|---|
| JP | 11-48363 | 2/1999 |
| JP | 2005161808 A * | 6/2005 |

\* cited by examiner

*Primary Examiner* — Joseph Del Sole
*Assistant Examiner* — Ryan Ochylski
(74) *Attorney, Agent, or Firm* — Cozen O'Connor

(57) ABSTRACT

A device for extruding a strip of rubber comprises a passage for forming the strip, which passage is defined by a rotary roller for forming and driving the strip. The device also comprises a shutter for shutting the forming passage, which shutter is deactivatable under the effect of the pressure of the rubber upstream from the shutter exceeding a predetermined threshold.

9 Claims, 2 Drawing Sheets

DEVICE FOR EXTRUDING A STRIP OF RUBBER

RELATED APPLICATION

This application claims the priority of French application no. 07/58692 filed Oct. 30, 2007.

FIELD OF THE INVENTION

The invention provides a device for extruding a strip of rubber.

The strip of rubber is for use in particular in tire manufacture.

BACKGROUND OF THE INVENTION

A device for extruding a strip of rubber is already known in the state of the art, which device comprises rubber feeder means, e.g. provided with a screw extruder, together with a passage for forming the strip of rubber.

The forming passage is defined firstly by a rotary roller for forming and driving the strip, and secondly by a forming member that is distinct from the roller, and that is placed in register with the roller, e.g. a blade.

In order to form the strip of rubber, the rotating roller acts through the forming passage to entrain the rubber that has been put under pressure by the feeder means.

When the rubber passes through the forming passage, the roller tends to exert surface stresses on a first face of the strip that are different from the stresses exerted by the blade on the second face of the strip. This difference in surface stresses is eliminated by the effect of the traction that is generally exerted on the strip downstream from the forming passage.

When the strip presents a desired length, extrusion is stopped and the extruded strip is cut away at the outlet from the forming passage. When the device restarts, during a transient stage, the rubber front is not subjected to any traction downstream from the forming passage, such that the first and second faces of the extruded strip present a surface tension difference that is not zero.

This tension difference tends to cause the strip to roll up downstream from the forming passage.

Parameters concerning the rubber, such as the adhesion of rubber on the roller, and the composition of the rubber can indeed be modified to limit this rolling-up effect. Nevertheless, those parameters are relatively difficult to control.

OBJECT AND SUMMARY OF THE INVENTION

An object of the invention is to avoid the rubber front rolling up when restarting the device, and to do so with the help of means that are simple.

To this end, one aspect of the invention is directed to a device for extruding a strip of rubber, the device being of the type including:

a passage for forming the strip, which passage is defined by a rotary roller for forming and driving the strip, and means for shutting the forming passage, which means are deactivatable in the event of the rubber upstream from the shutter means exceeding a predetermined pressure threshold.

By monitoring the pressure of the rubber, the device of the invention can prevent the rubber front from rolling up whenever the device restarts.

Below the predetermined threshold, the shutter means prevent any extrusion of the strip, and thus any rolling up. When the pressure of the strip upstream from the shutter means exceeds the predetermined threshold, then the rubber pressure is high enough to deactivate the shutter means and to prevent the extruded strip from rolling up.

According to optional features of the device of the invention:

the pressure of the rubber is taken downstream from the rubber feeder means. By way of example, the feeder means comprise a positive displacement pump, a piston pump, or indeed an extruder having a wormscrew; and the device includes means for measuring the pressure of the rubber against the shutter member.

Advantageously, the device includes means for driving rotation of the roller, which means are preferably activated under the following conditions.

One condition may be that the means for driving the roller in rotation are activated by deactivation of the shutter means, in particular by a member of the shutter means being moved.

Another condition for the means for driving rotation of the roller to be activated may be that the predetermined pressure threshold is exceeded. Under such circumstances, the extruded strip does not run any risk of rolling up while it is being extruded.

According to another optional feature of the device of the invention, the shutter means comprise a shutter member that is urged by rated means that are rated as a function of the predetermined threshold pressure between:

a deactivation position of the shutter means in which the shutter member contributes to forming the strip; and a position shutting the forming passage.

According to other optional features of the device of the invention:

the rated means comprise a spring or an actuator; and the device includes means for detecting the position of the shutter member.

In an embodiment, the shutter member is urged into a shut position against the periphery of the roller.

In another embodiment, the shutter member is formed by the roller, the roller being urged into the shut position against the outline of an orifice that forms the forming passage.

An other object of the invention is the use of a device as defined above for extruding a strip of rubber for use in tire manufacture.

BRIEF DESCRIPTION OF THE DRAWINGS

The invention can be better understood on reading the following description given purely by way of example and made with reference to the drawings, in which.

DETAILED DESCRIPTION OF THE DRAWINGS

Figure 1:
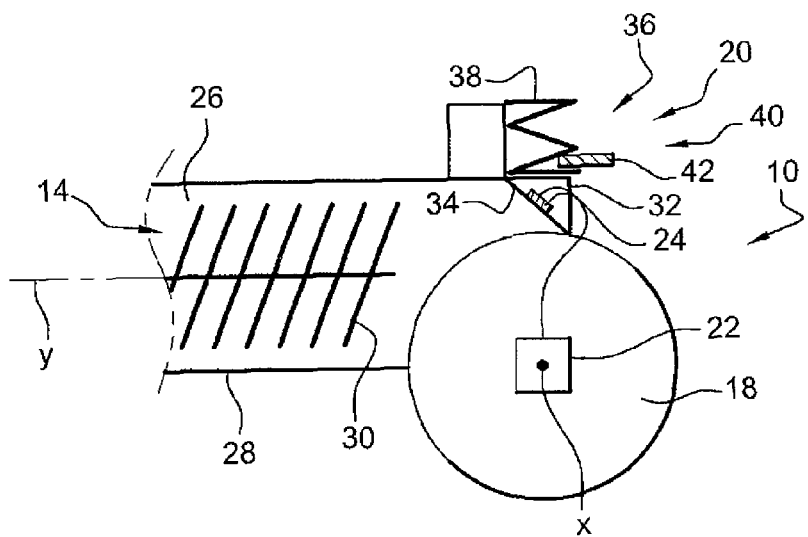
FIG. 1 is a section view of a device in a first embodiment of the invention for extruding a strip of rubber, the device including a shutter member that is movable into a shut position.
Figure 2:
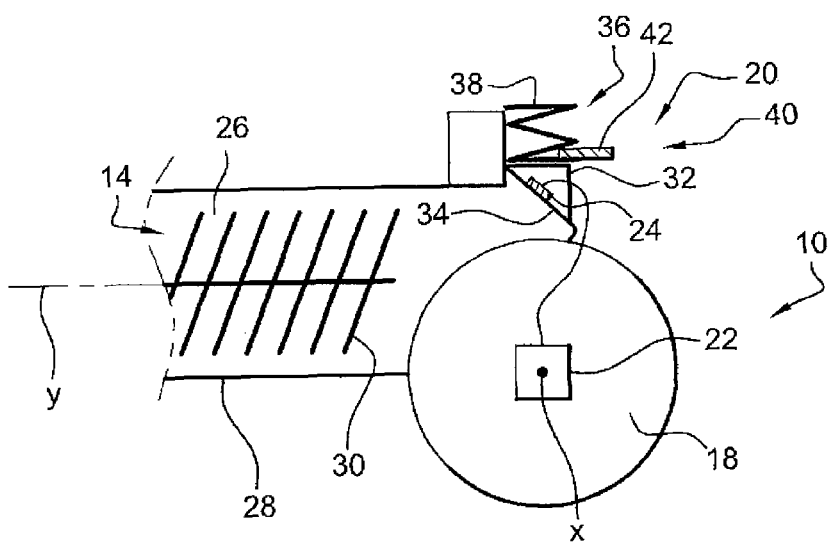
FIG. 2 is a section view of the FIG. 1 device in which the shutter member is in an intermediate position.
Figure 3:
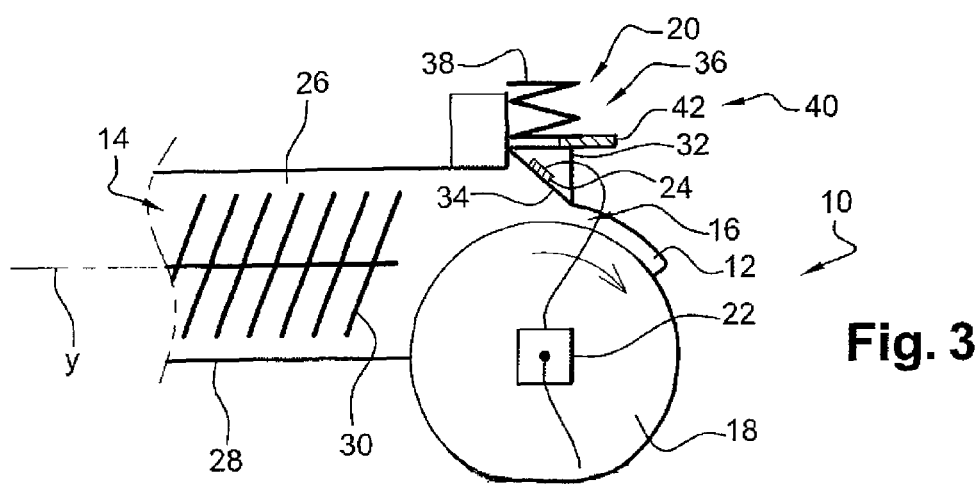
FIG. 3 is a section view of the FIG. 1 device in which the shutter member is in a deactivation position.

FIGS. 1 to 3 show a device for extruding a strip of rubber in a first embodiment of the invention. The device is given overall reference 10.

The device 10 is deigned to fabricate a strip 12 of rubber for use in tire manufacture.

The device 10 includes rubber feeder means 14.

the device 10 also includes a passage 16 for shaping the strip 12 and through which the feeder means 14 thrust the rubber under pressure.

The passage 16 is defined firstly by a rotary shaper roller 18 that also serves to drive the strip 12, and secondly by shutter means 20 for shutting the passage 16.

The device 10 also has means 22 for driving the roller 18 in rotation.

Furthermore, the device 10 has means 24 for measuring the pressure of the rubber upstream from the shutter means 20. Below, when reference is made to terms such as "upstream" and "downstream", that reference is relative to the direction to which the strip 12 is extruded through the passage 16.

Specifically, the feeder means 14 comprise an extruder 26 comprising a body 28 and a wormscrew 30 that is rotatable about an axis Y inside the body 28.

As shown in FIGS. 1 to 3, the shutter means 20 include a shutter member 32 distinct from the roller 18. The shutter member 32 has a bearing face 34 past which rubber coming from the feeder 14 can escape.

The shutter means 20 also include rated means 36 urging the shutter member 32 between:
- a position in which the forming passage 16 is shut, as shown in FIG. 1, in which position the shutter member 32 is urged against the roller 18; and
- a position in which the shutter means 20 are deactivated, in which position the shutter member 32 contributes to forming the strip, as shown in FIG. 3.

In the example shown in FIGS. 1 to 3, the rated means 36 comprise a spring 38. In a variant, the rated means 36 could comprise an actuator.

Between the shut position and the deactivation position, the shutter member 32 can occupy a so-called intermediate position, as shown in FIG. 2. In this intermediate position, the forming passage 16 is partially shut by the shutter member 32.

In addition, the shutter means 20 include a stroke-limiter member 40 for limiting the stroke of the shutter member 32, and specifically an abutment 42. When the shutter member 32 is in its deactivation position, the abutment 42 defines the deactivation position. In this position, the member 32 and the roller 18 define a nominal thickness for the strip 12.

The pressure of the rubber as measured by the pressure measurement means 24 is taken downstream from the rubber feeder means 14, here downstream from the wormscrew 30, and upstream from the shutter means 20. Specifically, the measurement means 24 are suitable for measuring the pressure of the rubber against the member 32. In a variant, the measurement means 24 are suitable for measuring the pressure of the rubber in the body 28 of the extruder 26 downstream from the wormscrew 30 and upstream from the member 32.

The shutter means 20 can be deactivated under the effect of the rubber upstream from the shutter means 20 exceeding a predetermined pressure threshold. As shown in FIGS. 1 to 3 the shutter member 32 is moved under the effect of the pressure of the rubber acting against the member 32, from its shut position towards its deactivation position, once this pressure exceeds the predetermined threshold. For this purpose, the rated spring 38 presents technical characteristics, in particular concerning its stiffness and un-loaded length, which characteristics are adapted so that the spring 38 does not compress beyond the predetermined pressure threshold.

The means 22 for driving rotation of the roller 18 are connected to the measurement means 24 and are activated by the predetermined threshold being exceeded as detected by the measurement means 24. These drive means 22 comprise in particular a motor (not shown) suitable for rotating the roller about an axis X of rotation that is substantially perpendicular to the plane of FIGS. 1 to 3.

Figure 4:
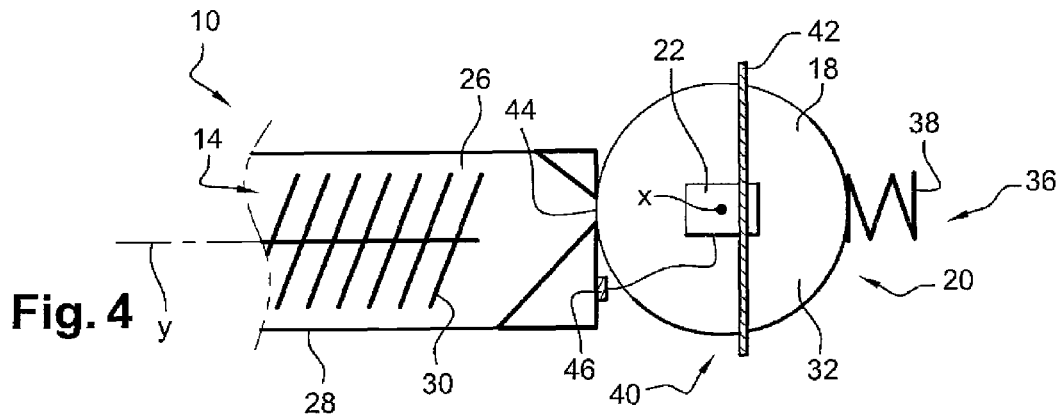
FIGS. 4 to 6 are views analogous to FIGS. 1 to 3 showing a device constituting a second embodiment of the invention for extruding a strip of rubber.
Figure 5:
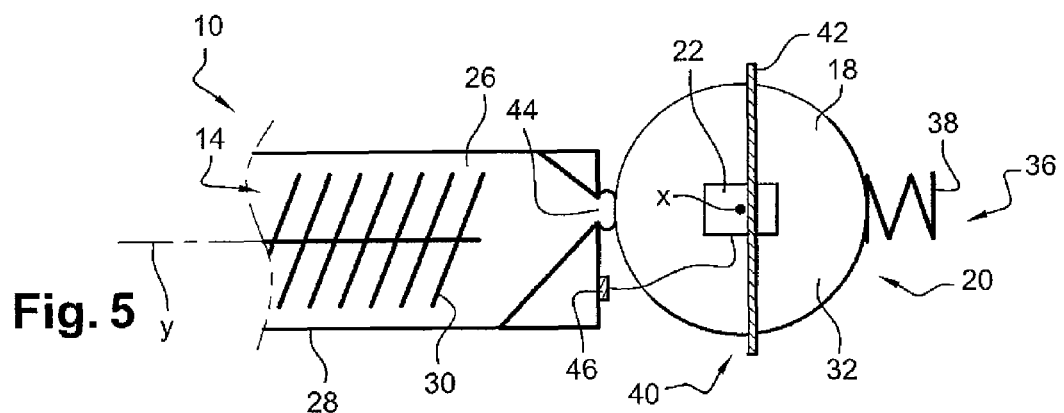
Figure 6:
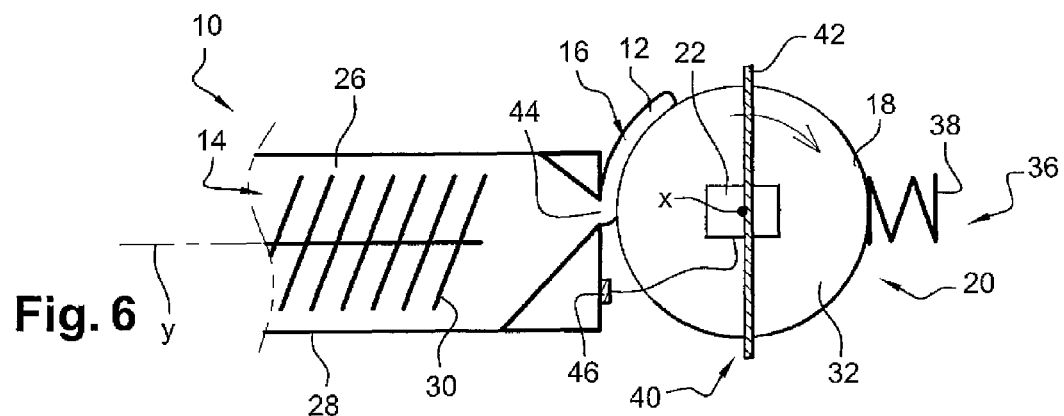

FIGS. 4 to 6 show a device for extruding a strip of rubber in a second embodiment. In these figures, elements analogous to those shown in the preceding figures are designated by identical references.

Unlike the device in the first embodiment, the extruder 26 has a rubber outlet orifice 44 arranged in the body 28 of the extruder 26. This orifice 44 forms the passage 16 for forming the strip of rubber 12.

In this second embodiment, the shutter member 32 is formed by the roller 18. The roller 18 is placed in register with the orifice 44 in such a manner as to be urged by the spring 38 against the outline of the orifice 44 in the shut position, as shown in FIG. 4.

As shown in FIG. 5, where the roller 18 is in an intermediate position, the roller 18 releases the passage 16 for forming the rubber strip 12 once the pressure of the rubber exceeds the predetermined threshold.

FIG. 6 shows the deactivation position of the roller 18.

Unlike the first embodiment, the means 22 for driving the roller 18 in rotation are activated by deactivation of the shutter means 20, in particular by the shutter member 32 moving.

Specifically, the device includes means 46 for detecting the position of the shutter member 32, or in a variant means for detecting movement of the shutter member 32. The drive means 22 are connected to the detector means 46 and they are activated by the shutter member 32 moving, as detected by the member 46.

The invention is not limited to the embodiments described above.

The device 10 may comprise firstly means 22 for driving the roller that are activated by the pressure threshold being exceeded, and secondly a shutter member 32 formed by the roller 18.

Furthermore, the device 10 may comprise firstly means 22 for driving the roller that are activated by deactivation of the shutter means 20, in particular by the shutter member being moved, and secondly a shutter member 32 that is urged into the shut position against the periphery of the roller 18.

Furthermore, in the device of the first embodiment, the shutter member 32 need not participate in forming the strip. Under such circumstances, the passage 12 is defined by the roller 18 and by a blade that is stationary relative to the roller 18. The shutter member 32 may be situated downstream or upstream from the blade.

What is claimed is:

1. A device for extruding a strip of rubber, comprising:
a passage for forming the strip, which passage is defined by
a rotary roller for forming and driving the strip, and
a shutter assembly configured to shut the forming passage, the shutter assembly being deactivatable in the event of a pressure of the rubber upstream from the shutter assembly exceeding a predetermined pressure threshold,
wherein the shutter assembly comprises a shutter member that is urged by rated means, which are rated as a function of the predetermined pressure threshold, between:
a deactivation position of the shutter assembly in which the shutter member contributes to forming the strip; and
a position shutting the forming passage.

2. The device according to claim 1, wherein the rubber pressure is taken into consideration downstream from a rubber feeder.

3. The device according to claim 1, including a measurement device configured to measure the pressure of the rubber against the shutter member.

4. The device according to claim 1, including a driver configured to drive the roller in rotation, the driver being activated by:

deactivation of the shutter, assembly by a member of the shutter assembly being moved; or by the predetermined pressure threshold being exceeded.

5. The device according to claim 1, wherein the rated means comprise a spring or an actuator.

6. The device according to claim 1, including a detector configured to detect the position of the shutter member.

7. The device according to claim 1, wherein the shutter member is urged into a shut position against the periphery of the roller.

8. The device according to claim 1, wherein the shutter member is formed by the roller, the roller being urged into the shut position against the outline of an orifice that forms the forming passage.

9. Apparatus for extruding a strip of rubber for use in tire manufacture, comprising a device according to claim 1.

* * * * *